E. B. ATTWELL,

Assignor to ATTWELL MANUFACTURING COMPANY.

SASH FASTENER.

No. 10,483. Reissued June 3, 1884.

Attest,

Jno. E. Giles,

Gus. R. Meyer

Inventor,

Ewell B. Attwell by Stern & Beck his Attys.

N. PETERS, Photo-Lithographer, Washington, D. C.

UNITED STATES PATENT OFFICE.

EWELL B. ATTWELL, OF LEESBURG, VIRGINIA, ASSIGNOR TO ATTWELL MANUFACTURING COMPANY, OF COVINGTON, KENTUCKY.

SASH-FASTENER.

SPECIFICATION forming part of Reissued Letters Patent No. 10,483, dated June 3, 1884.

Original No. 260,271, dated June 27, 1882. Application for reissue filed August 27, 1883.

*To all whom it may concern:*

Be it known that I, EWELL B. ATTWELL, a citizen of the United States, residing at Leesburg, Loudoun county, Virginia, have invented a new and useful Improvement in Sash-Fasteners, of which the following is a specification.

This invention relates, primarily, to a certain class of sash-fasteners which provide for separately locking and unlocking the upper and lower sashes of an ordinary house-window, so that each may be fastened at different heights, a single key or finger lever being used in connection with a pair of spring-projected dogs, which are pivoted by means of the key-shaft within one of the uprights of the window-frame at mid-height.

Heretofore sash-fasteners of this description, so far as I am informed, have lacked the security of a practically removable key, (common in some other form of sash-fasteners,) by which I mean a key which can be withdrawn at will to render the locked fastener inaccessible, and as readily replaced. The displacement of the dogs by their springs and by the weight of the sashes when the key-shaft is withdrawn has tended to make this seem impracticable.

The principal object of the present invention is to provide for readily removing and replacing the key at will in a sash-fastener of said description, which I accomplish by providing the dogs with supplemental pivots working in slots in metallic housings, whereby they are securely held in place independently of the key-shaft.

Another object of this invention is to prevent the accidental retraction of either of the fastener-dogs, so as to insure the control of an elevated sash by the hand of the operator before it is unfastened. This I accomplish by providing the holes in the sash-edges with metallic bushings cut away at the top to form detents, the head of each dog being flanged to coact therewith.

Figure 1:
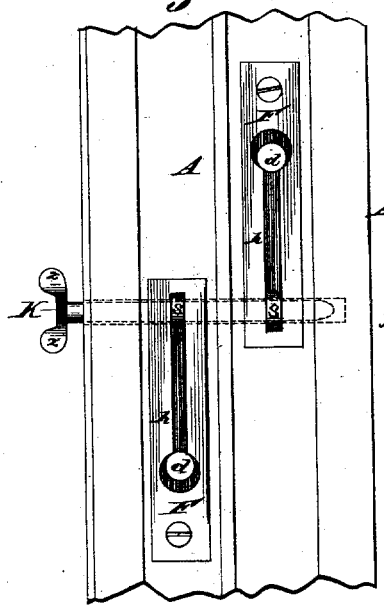
Figure 2:
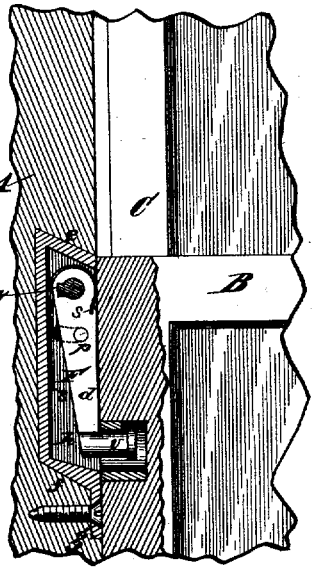
Figure 3:
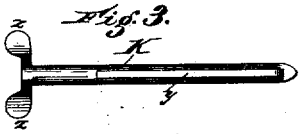
Figure 4:
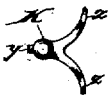
Figure 6:
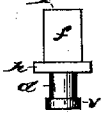
Figure 7:
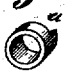
Figure 5:
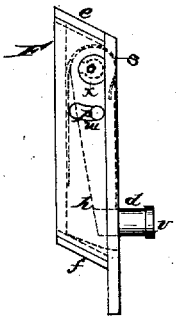

Figure 1 of the accompanying drawings is an inner face view of a window-frame upright provided with my improved sash-fastener. Fig. 2 is a vertical section on the line 2 2, Fig. 1. Fig. 3 is a back view. Fig. 4 is an end view of the key removed. Fig. 5 is a side view. Fig. 6 is an end view of one of the fasteners. Fig. 7 is a perspective view of one of the sash-hole bushings.

Like letters of reference indicate corresponding parts in the several figures.

A represents the left-hand upright of an ordinary house-window frame, and B C respectively lower and upper sashes sliding therein.

F F represent a pair of my individual sash-fasteners, of one and the same pattern; and K, a removable key, of a preferred shape, for unlocking both separately. Said key K, Figs. 1, 4, is constructed with a pair of thumb-rests, *z z*, corresponding with the respective fasteners, and with a continuous longitudinal spline, *y*, on the back of its cylindrical shaft. Each individual sash-fastener F, Figs. 1, 2, 5, and 6, is composed of a fastener-dog, *d*, and a metallic housing, *h*, with the spring *s* of the former. Near one end the body of the fastener-dog *d* is provided with an orifice, *o*, Fig. 2, loosely fitted to the shaft of the key K, which, when inserted, constitutes the main pivot of the dog. The housing *h* has corresponding orifices *x* in both sides. A pair of supplemental pivots, *p*, preferably cast on the fastener-dog, are located adjacent to said orifice *o*, and occupy curved slots *w* in the lateral sides or cheeks of the housing, which coact therewith to preserve the normal position of the fastener-dog when the key K is withdrawn, while permitting the fastener-dog to be moved freely by its spring and the key. To admit the fastener-dog provided with said supplemental pivots, one side of the housing is made removable, as shown in Fig. 5, solid supports for its ends being provided, so as to prevent its displacement by the weight of a supported sash. It is securely held in place by the contiguous wall of the mortise in the window-frame upright A, in which the housing is embedded.

The spring *s*, which is preferably a long piece of hoop-skirt steel, is attached at one end within a slit in what may be termed the "front" of the fastener-dog, and is carried around the pivot end to bear on the back of the housing behind the dog, its attached end being thus relieved from transverse breaking strains.

The pivots of the fastener-dog *d* are located at one of its ends, as aforesaid. Its head is located at its other extremity, projecting in normal position from the face of the housing *h*, as shown in the several views, and is constructed with a flange, *v*, to coact with a recess in the top of a tubular bushing, *u*, Figs. 2 and 7, within the coacting socket-hole in the edge of the sash B C. The gravitation of the sash causes said flange to enter said recess, and the fastener-dog is then locked against retraction by the key, which prevents accidentally retracting either fastener-dog of a pair in use, as it is necessary for the operator to slightly raise the sash which is to be unfastened in order to unlock it. The edge of each sash may be provided with any preferred number and arrangement of bushed socket-holes.

The housing *h* is constructed of the external shape represented, with parallel inclined ends *e f*, and with a face extension, *g*, containing a countersunk screw-hole at one extremity, to provide for securing the same within a mortise of corresponding shape, easily cut in the window-frame upright A, by means of a single screw, as shown in Figs. 1 and 2, the housing end opposite the screw forming a half-dovetail, which, in the upper fastener of a pair, is at its lower end, and precludes loosening by the weight of the constantly-supported upper sash. Besides the pair of mortises to receive the two individual sash-fasteners, said window-frame upright is simply provided with an auger-hole, which may be furnished with a metallic bushing at its outer end to receive the removable key K.

Having thus fully described my said invention, I claim—

1. The combination, as herein set forth, of a pair of individual sash-fasteners, F F, and a removable key, K, each of said individual sash-fasteners comprising a spring-projected fastener-dog, *d*, having an orifice, *o*, to receive and coact with the shaft of said key, and supplemental pivots *p*, working in slots *w* in a metallic housing, to support the individual fastener-dogs independently of said key, substantially as specified.

2. In a sash-fastener of the class herein set forth, the combination, with a pair of spring-projected fastener-dogs having flanged heads, of recessed tubular bushings *u* within the socket-holes in the edges of the respective sashes, to prevent accidentally unfastening either sash, as herein specified.

3. In a sash-lock, the combination of the housing and its segmental slots, the spring-projected dog pivoted in said slots, and the removable key engaging the dog and forming the pivot upon which the latter is oscillated to release the window, substantially as described.

4. In combination with the movable window-sashes and the frame therefor, two spring-projected dogs hung in independent housings upon supplemental sustaining-pivots, and a removable key operating upon both dogs, substantially as described.

EWELL B. ATTWELL.

Witnesses:
RICHD. H. TEBBS,
E. B. POWELL.